United States Patent [19]
Dey et al.

[11] Patent Number: 5,862,408
[45] Date of Patent: Jan. 19, 1999

[54] MICROPROCESSOR SYSTEM HAVING MULTIPLEXOR DISPOSED IN FIRST AND SECOND READ PATHS BETWEEN MEMORY CPU AND DMA FOR SELECTING DATA FROM EITHER READ PATH

[75] Inventors: Shankar Dey, San Jose, Calif.; Dinh Kim Bui; Ming Zhao, both of Austin, Tex.

[73] Assignee: Advanced Micro Devices, Inc., Sunnyvale, Calif.

[21] Appl. No.: 648,523

[22] Filed: May 13, 1996

[51] Int. Cl.$^6$ ........................................ G06F 13/14
[52] U.S. Cl. ......................... 395/858; 395/842; 395/847; 395/848; 395/871
[58] Field of Search ......................... 395/185.06, 185.03, 395/821, 287, 310, 185.01, 307, 306, 872, 500, 858, 842, 847, 848, 871; 711/163

[56] References Cited

U.S. PATENT DOCUMENTS

| | | | |
|---|---|---|---|
| 4,982,321 | 1/1991 | Pantry et al. | 395/287 |
| 5,289,586 | 2/1994 | Umekita et al. | 395/310 |
| 5,307,468 | 4/1994 | Schlage | 711/163 |
| 5,313,627 | 5/1994 | Amini et al. | 395/185.06 |
| 5,333,274 | 7/1994 | Amini et al. | 395/185.03 |
| 5,386,548 | 1/1995 | Nguyen et al. | 395/872 |
| 5,426,769 | 6/1995 | Pawloski | 395/500 |
| 5,428,746 | 6/1995 | Dalrymple | 395/306 |
| 5,446,845 | 8/1995 | Arroyo et al. | 395/307 |
| 5,495,573 | 2/1996 | Datwyler et al. | 395/185.01 |
| 5,499,384 | 3/1996 | Lentz et al. | 395/821 |

FOREIGN PATENT DOCUMENTS

| | | | |
|---|---|---|---|
| 0 094179 A | 4/1983 | European Pat. Off. | G06F 3/04 |
| 0 588607A | 9/1993 | European Pat. Off. | G06F 15/78 |

OTHER PUBLICATIONS

IBM Tech Disc Bull, vol. 32. No. 1, Jun. 1989, pp. 396–404.Simultaneous dual port direct memory access tra.
IBM Tech Disc Bull, vol. 37. No. 04b, Apr. 1994, p. 487"Overlapped Operations on Coupled Data Busses".
International Conf. on Acoustics Speech and Sig. Processing, vol. 4, 23 May 1989, pp. 2480–2483 The Motorola DSP96002 IEEE Floating–point Digital Signal Processor.

*Primary Examiner*—Le Hien Luu
*Attorney, Agent, or Firm*—H. Donald Nelson

[57] ABSTRACT

A microprocessor system having a first read path from memory and a second read path from peripheral units and an isolation buffer to isolate the first read path from the second read path. The system also has a first write path to memory and a second write path to peripheral units and an isolation buffer to isolate the first write path from the second write path. The isolation buffers also isolate the write paths from the read paths. Also included is a monitoring path between the peripherals and an external bus to allow program monitoring of data in the peripheral units.

2 Claims, 2 Drawing Sheets

5,862,408

MICROPROCESSOR SYSTEM HAVING MULTIPLEXOR DISPOSED IN FIRST AND SECOND READ PATHS BETWEEN MEMORY CPU AND DMA FOR SELECTING DATA FROM EITHER READ PATH

BACKGROUND OF THE INVENTION

1. Field of the Invention

This invention relates generally to microprocessor systems and more particularly, to microprocessor systems having first and second read paths and first and second write paths and buffers to isolate the first and second read paths and the first and second write paths.

2. Discussion of the Related Art

The semiconductor industry is increasingly characterized by a growing trend toward fabricating more circuits on a given semiconductor chip. In addition, the circuits are more complex in order to provide the higher performance required by end users of the semiconductor chips. To achieve the higher performance demanded by the end users it is necessary to not only provide more complexity in the circuits and functions, but also to ensure that the circuits are smaller and faster. This is being achieved not only by reducing the size of individual devices but by placing the circuits closer together. In turn, this means that more circuits have to be interconnected. The method of interconnection must not detract from the performance and speed of the various functions on the semiconductor chip.

An interconnect provides a path or a medium for an electrical signal that is delivered from a source device to a destination or load device as illustrated in FIG. 1, in which CPU 12 is a source device when writing to a load device such as PIC 24, SCU 26, or MCU 28, for example. The interconnect 40 connects CPU 40 to the load devices. As shown in FIG. 1 there are usually more than one load device physically connected to the same interconnect.

One of the major problems associated with an interconnect is that the passage of an electrical signal through an interconnect takes time which, in turn, depends upon how much capacitance is present in the interconnect. The capacitance relates to the amount of electrical charge that needs to be added to or taken out from the interconnect as the source voltage changes from a low to high or from a high to a low. The amount of charge depends upon the width and length of the interconnect as well as on the interconnects distance from other signal interconnects and power paths. Additionally, the input nodes of any load or distribution device also add to the capacitance load. These capacitance loads are generally higher than interconnect capacitance loads. When many loads are connected to the same electrical point, all the capacitances together become formidable for a driver device, which slows down signal transitions, both from one point to another and from one value to another. The net result is that more time is required for signal transitions which detracts upon device performance and speed.

This invention is a solution to this problem and is accomplished by physically isolating the bigger capacitance loads. The devices used for the isolation are multiplexors (muxes) and buffers. The muxes help to keep the capacitive loads of the driver ports separated and in this way signals from an active driver is not impeded by the capacitive loads for non-active drivers. The buffers, on the other hand, isolate the capacitive loads of branches from the main trunk. As a result, the signals through the main trunk moves faster but still get transmitted to the branches. This ensures that regardless of how many branches there are, the signal transition times on the main trunk is not influenced the number of branches.

SUMMARY OF THE INVENTION

A microprocessor system with a first read path from system memory to the CPU and a second read path from peripherals to the CPU and a buffer isolating the first read path from the second read path.

The microprocessor system has a first write path from the CPU to system memory and a second write path from the CPU to the peripherals and a buffer isolating the first writ path from the second write path.

The microprocessor system has a DMA and the first read path connects the system memory to the DMA and the second write path connects the DMA to the peripherals.

The microprocessor system has a monitoring path connecting the peripherals to an external data bus via the first write path.

The buffer isolating the read paths also serves to isolate the write paths from the read paths.

The present invention is better understood upon consideration of the detailed description below in conjunction with the accompanying drawings. As will become readily apparent to those skilled in this art from the following description there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention. In the drawings.

DETAILED DESCRIPTION

Figure 1:
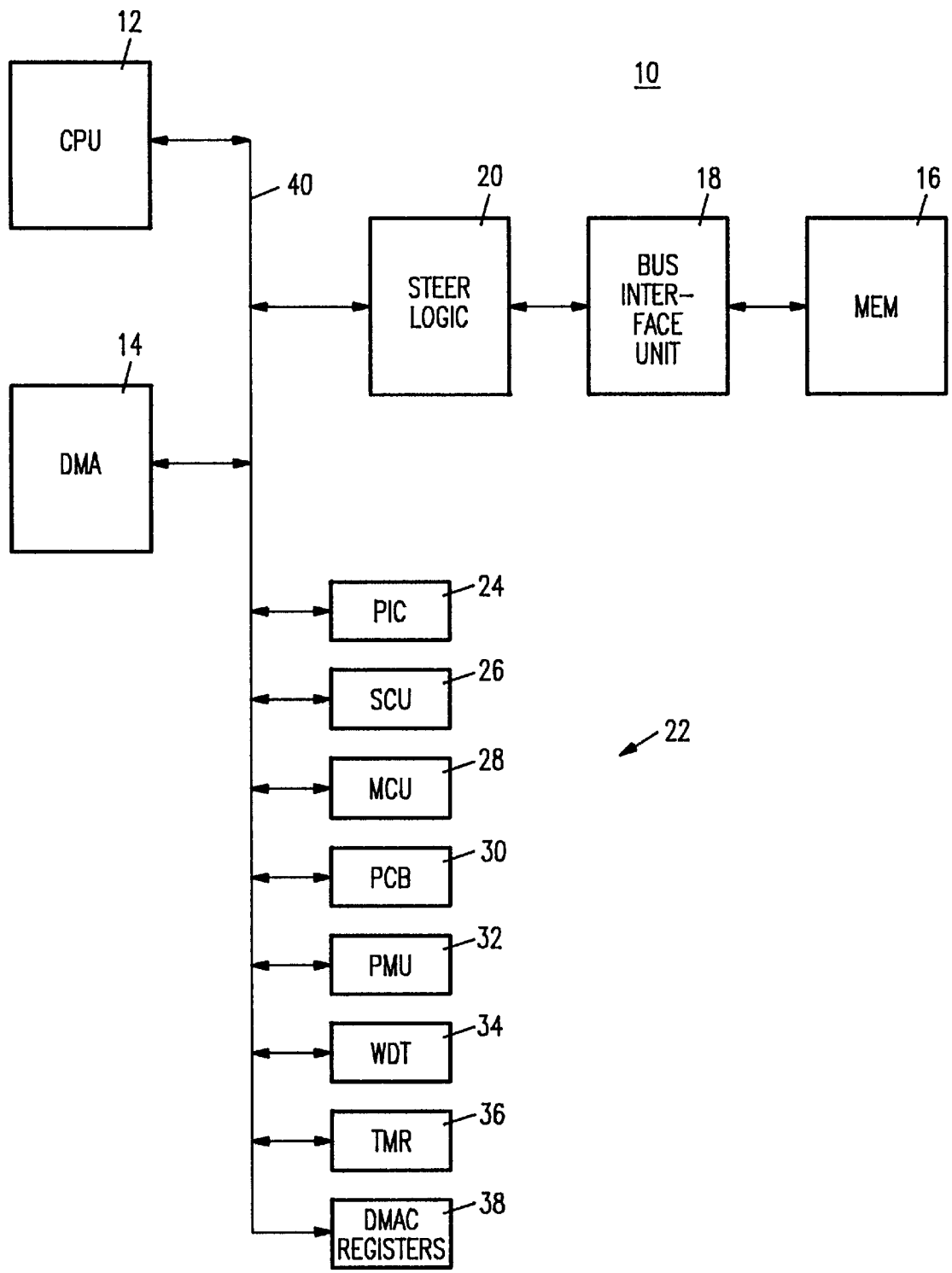
FIG. 1 shows a prior art microprocessor system.

FIG. 1 shows a prior art microprocessor system 10 having a CPU (central processing unit) 12, a DMA (direct memory access unit) 14, memory 16, and a bus interface unit 18 and steer logic 20 which comprises the basic microprocessor system. In addition to the basic microprocessor system, a number of peripheral units indicated at 22 are included in many microprocessor systems. Peripherals shown in FIG. 1 are a PIC (Programmable Interrupt Controller) 24, an SCU (Serial Communications Unit) 26, an MCU (Memory Controller Unit) 28, a PCB (Peripheral Control Block) 30, a PMB (Power Management Unit) 32, a WDT (Watchdog Timer) 34, a TMR (Timer unit) 36, and a DMAC (Direct Memory Access Controller) 38. Bus 40 provides read and write capabilities between the CPU 12 and DMA 14, with peripherals 22 or memory 16.

Figure 2:
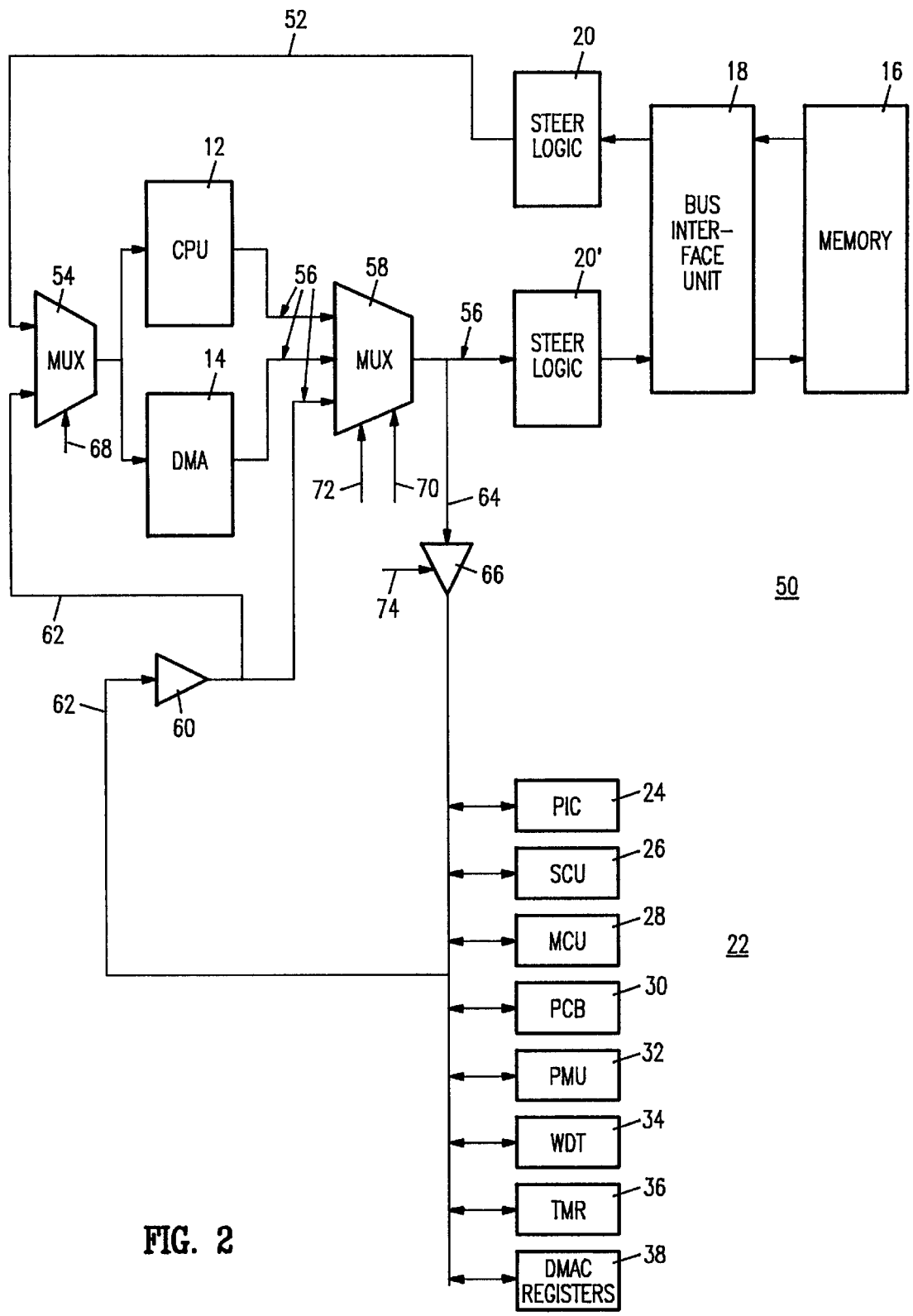
FIG. 2 shows the microprocessor system of the present invention.

FIG. 2 shows an embodiment of the present invention. Elements in FIG. 2 that are the same as elements in FIG. 1 have the same numerical indicators as FIG. 1. FIG. 2 shows a microprocessor system 50 with a CPU 12, a DMA 14, a memory 16, a bus interface unit 18 and steer logic 20 and 20'. The steer logic 20 and 20' in FIG. 2 is shown as two elements for discussion purposes, however, it should be understood that steer logic 20 and 20' can be a single element in microprocessor 50. The microprocessor system 50 also has a number of peripherals indicated at 22 that are shown as the same as those shown in FIG. 1. It should be understood that additional peripherals can be easily added to microprocessor system 50 because the isolation buffers (to be discussed later) of the present invention isolate the basic read and write buses from the peripheral so that capacitances caused by the peripherals do not degrade the performance of the microprocessor system.

Microprocessor system 50 in FIG. 2 has a first read path 52 from memory 16 via bus interface unit 18 and steer logic unit 20 to CPU 12 and DMA 14 via a multiplexor 54. A first write path 56 connects CPU 12 and DMA 14 to memory 16 via multiplexor 58, steer logic 20', and bus interface unit 18. Multiplexor 58 is a three input multiplexor with an input from CPU 12, DMA 14 and an input from peripherals 22 via isolation buffer 60. The input from peripherals 22 via isolation buffer 60 provides internal peripheral read cycle data to an external data bus for program monitoring purposes. Program monitoring is used during the program development phase during which it helps to debug if internal peripheral read/write cycle data is observable at the outside pins of the semiconductor chip.

A second read path 62 connects peripherals 22 to multiplexor 54 via isolation buffer 60. A second write path 64 connects CPU 12 and DMA 14 to peripherals 22 via isolation buffer 66.

The operation of microprocessor system 50 is as follows. First, for a memory read cycle, CPU 12 or DMA 14 initiates a data read cycle to fetch data from memory 16. A control unit (not shown) sends a select control signal to multiplexor 54 via select line 68 to select input from line 52. CPU 12 or DMA 14, whichever initiates the read cycle, uses the fetched data. During the write cycle, the control unit sends select control signals to multiplexor 58 via select lines 70 and 72. During this write cycle to memory, the control unit does not activate the control signal 74 to isolation buffer 66 which instructs isolation buffer 66 to not pass the data being sent on write path 56 to peripherals 22.

If the data is being written to one of the peripherals 22, the control unit will instruct isolation buffer 66 to allow the data on write path 56 to be communicated to peripherals 22 via write path 64.

Similarly, if monitoring is to be done, data from peripherals 22 is communicated to an external data bus (not shown) via isolation buffer 60 and multiplexor 58. The control unit sends select control information to multiplexor 58 via select control lines 70 and 72 and, at the same time, instructs isolation buffer 66 to not transmit data on write path 56 to peripherals 22.

Isolation buffers 60 and 66 can be two logic gate inverters connected back-to-back. Because an inverter is a logic gate that delivers an output signal which is a logical inversion of the input the output of the two back-to-back inverters is in the same logic state as the input and hence there is no logic inversion in the signal as it passes through the buffer. The inverters also provide gains to the signal which influences its transition time. The main advantage of using a MOS buffer is because it isolates the input from the output and therefore the capacitance on the output interconnect does not load the input.

The foregoing description of the embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention if various embodiments and with various modifications as are suited to the particular use contemplated. All such modifications and variations are within the scope of the invention as determined by the appended claims when interpreted in accordance with the breadth to which they are fairly, legally, and equitably entitled.

What we claim is:

1. A microprocessor system having a CPU, a DMA unit, a memory, and at least one peripheral unit, wherein said microprocessor system comprises:

a first read path connecting said memory and said CPU;

a second read path connecting said at least one peripheral and said CPU;

a first buffer isolating said first read path from said second read path;

a first write path connecting said CPU and said memory;

a second write path connecting said CPU and said at least one peripheral wherein said first buffer isolates said second write path from said first read path;

a second buffer isolating said first write path from said second write path and isolating said first write path from said second read path;

a DMA unit and wherein said first read path connects said memory and said DMA unit and wherein said second write path connects said DMA and said at least one peripheral;

a monitoring path connecting said at least one peripheral to an external data bus via said first write path; and a first multiplexor disposed in said first and second read paths between said memory and said CPU and said DMA, wherein said first multiplexor selects between said first read path and second read path.

2. The microprocessor system of claim 1, further comprising a second multiplexor disposed in said first and second write paths between said CPU and said DMA unit and said memory, wherein said second multiplexor selects between said first write path, said second write path and said monitoring path.

* * * * *